(12) United States Patent
Dino et al.

(10) Patent No.: US 7,989,402 B2
(45) Date of Patent: Aug. 2, 2011

(54) FUNCTIONALIZED CLAY COMPOSITIONS FOR AQUEOUS BASED DRILLING FLUIDS

(75) Inventors: David Dino, Cranbury, NJ (US); James Michael Foley, Mendham, NJ (US)

(73) Assignee: Elementis Specialties, Inc., Hightstown, NJ (US)

( * ) Notice: Subject to any disclaimer, the term of this patent is extended or adjusted under 35 U.S.C. 154(b) by 456 days.

(21) Appl. No.: 11/521,251

(22) Filed: Sep. 14, 2006

(65) Prior Publication Data

US 2008/0070811 A1    Mar. 20, 2008

(51) Int. Cl.
*C09K 8/60*    (2006.01)
*C09K 8/32*    (2006.01)

(52) U.S. Cl. ........................................ 507/240; 507/129
(58) Field of Classification Search .................. 507/110, 507/129, 240
See application file for complete search history.

(56) References Cited

U.S. PATENT DOCUMENTS

| | | |
|---|---|---|
| 5,097,904 A | 3/1992 | Himes |
| 5,112,603 A | 5/1992 | Nadolsky et al. |
| 5,380,706 A | 1/1995 | Himes et al. |
| 5,710,110 A | 1/1998 | Cooperman et al. |
| 6,281,172 B1 * | 8/2001 | Warren et al. ................. 507/110 |
| 6,316,538 B1 | 11/2001 | Anderson et al. |
| 6,337,366 B1 | 1/2002 | Amick et al. |
| 6,399,690 B2 * | 6/2002 | Lan et al. ...................... 524/445 |
| 6,503,975 B1 | 1/2003 | Huybrechts |
| 6,794,437 B2 | 9/2004 | Ross et al. |
| 2004/0110642 A1 | 6/2004 | Thompson et al. |
| 2004/0157748 A1 | 8/2004 | Dino |
| 2004/0176478 A1 | 9/2004 | Dahayanake et al. |

OTHER PUBLICATIONS

PCT/US2007/19557 Search Report.

* cited by examiner

*Primary Examiner* — Timothy J. Kugel
*Assistant Examiner* — Aiqun Li
(74) *Attorney, Agent, or Firm* — Morgan, Lewis & Bockius LLP

(57) ABSTRACT

An aqueous drilling fluid which contains a diquaternary ammonium cation functionalized clay which provides a substantially constant rheological profile, with respect to salinity, when incorporated into well drilling fluids. A clay/organic chemical composition includes: (a) montmorillonite clay and (b) one or more diquaternary ammonium compounds. A further aspect of the invention is a well drilling process which employs a drilling fluid containing the diquaternary ammonium cation functionalized clay described hereafter.

4 Claims, No Drawings

FUNCTIONALIZED CLAY COMPOSITIONS FOR AQUEOUS BASED DRILLING FLUIDS

FIELD OF THE INVENTION

The present invention relates to aqueous fluids used for drilling of oil, gas and geothermal wells in earth formations, and to additives for use in such fluids. More particularly, the invention relates to an aqueous-based drilling fluid containing specific types of functionalized clay.

SUMMARY OF THE INVENTION

The present invention provides for an aqueous drilling fluid which contains a diquaternary ammonium cation functionalized clay which provides a substantially constant rheological profile, with respect to salinity, when incorporated into well drilling fluids. A further aspect of the invention is a well drilling process which employs a drilling fluid containing the diquaternary ammonium cation functionalized clay described hereafter.

The present invention further provides for a clay/organic chemical composition which includes: (a) montmorillonite clay and (b) one or more diquaternary ammonium compounds.

DETAILED DESCRIPTION OF THE INVENTION

Well drilling fluids are also referred to as muds, drilling muds, drill fluids, drilling fluids, oil well fluids and oil well drilling fluids in the industry and these terms should be understood as interchangeable throughout this application. It will be understood that these terms refer to a fluid which is pumped into a well during the drilling operation. The well itself may be for gas, oil or any other purpose where a well drilling fluid is used. The drilling fluids of this invention are water or aqueous based fluids.

One embodiment of the present invention provides for an aqueous drilling fluid containing a diquat functionalized clay composition. A diquat is a compound that contains two cationic nitrogen centers. The diquat functionalized clay composition includes montmorillonite clay and one or more diquaternary ammonium compounds. Montmorillonite clay is a very soft phyllosilicate mineral that typically forms in microscopic crystals. Montmorillonite is a member of the smectite family having two tetrahedral sheets sandwiching a central octahedral sheet. Montmorillonite clays are swellable layered clays which contain individual platelets. Both naturally occurring and synthetic clays may be used in the invention. Naturally occurring hydrous phyllosilicates such as vermiculites may also be useful in this invention. Synthetic clays useful for this invention are those that can be identified as belonging to the smectite group of clay minerals, but also synthetic vermiculite and synthetic micas can be used in this invention.

The clays which may be used in the present invention preferably have a cationic exchange capacity of at least 45 milliequivalents per 100 grams of clay, 100% active clay basis, as determined by the well-known ammonium acetate method. Preferred montmorillonite clays are the naturally-occurring Wyoming variety of swelling bentonite and like clays, and hectorite, a swelling magnesium silicate clay. Bentonite and its properties are described at length in the chapter entitled "Bentonite," in Carr, D., ed. 1994, Industrial Minerals and Rocks, 6th Edition (published by the Society For Mining, Metallurgy and Exploration, Colorado).

Montmorillonite clays are well known in the art and are commercially available from a variety of sources. Ideally, the clays are in the sodium form, or converted to the sodium form prior to use in the invention. This conversion is performed by preparing an aqueous clay slurry and passing the slurry through a bed of cation exchange resin in the sodium form. Alternatively, the clay is mixed with water and a soluble sodium compound, such as sodium carbonate, sodium hydroxide, etc., and the mixture sheared, such as with a pug-mill or extruder. Representative montmorillonite clays useful in accordance with the present invention are described in detail in "Hydrous Phyllosilicates, Reviews in Mineralogy, Volume 19, S. W. Bailey, editor". Both sheared and non-sheared forms of the above-listed montmorillonite clays may be employed. Elementis Specialties, Inc. and its predecessor have issued patents describing the shearing of smectite clays, as in U.S. Pat. No. 4,695,402 and U.S. Pat. No. 4,742,098 both of which are incorporated herein by reference in their entirety. In addition, the montmorillonite clay employed can be either crude (containing gangue or non-clay material) or beneficiated (gangue removed). The ability to use crude clay represents a substantial cost savings, because the clay beneficiation process and conversion to the sodium form are not required.

The organic cationic compounds of the present invention are selected from alkoxylated and non alkoxylated diquaternary ammonium cations that are capable of forming a functionalized clay by exchange of cations with the montmorillonite clay. In one embodiment, the organic cationic compound(s) of the invention include diquaternary ammonium cations, or mixtures thereof, having the following formula:

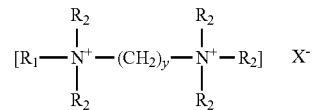

wherein, $R_1$ includes a linear or branched, saturated or unsaturated alkyl group having one to 30 carbon atoms or —$(CR_3R_4$—$CR_5R_6O)_zH$, where $R_3$, $R_4$, $R_5$, and $R_6$ are independently selected from the group consisting of H—, $CH_3$—, and $CH_3CH_2$—. In a preferred embodiment, $R_1$ includes methyl. In another preferred embodiment, $R_3$, $R_4$, $R_5$, and $R_6$ include methyl or hydrogen. In a yet another preferred embodiment, $R_3$, $R_4$, $R_5$, and $R_6$ include hydrogen. In a preferred embodiment $R_1$ includes methyl. In one embodiment, repeat unit z ranges from 0 to 30. In a more preferred embodiment, repeat unit z ranges from 0 to 12. $R_2$ includes $R_1$ or a linear or branched, saturated or unsaturated alkyl group having one to 30 carbon atoms. In a preferred embodiment, $R_2$ is selected from the group consisting of hydrogen, methyl, hexadecane and octadecane. In a more preferred embodiment, $R_2$ is methyl. Repeat unit y ranges from 2 to 22. In another embodiment, repeat unit y ranges from two to twelve. In a preferred embodiment, repeat unit y ranges from two to six. In a more preferred embodiment, repeat unit y ranges from two to four. $X^-$ includes an anion selected from the group consisting of chloride, methyl sulfate, acetate, iodide, and bromide, preferably chloride.

An example of preferred diquaternary ammonium compounds used to make the organoclay compositions of this invention is:

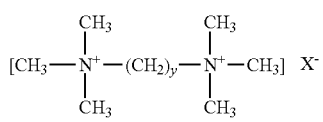

wherein y ranges from two to four.

The present invention further provides for an aqueous drilling fluid for drilling oil and gas wells. The aqueous drilling fluid includes water, up to 32 wt. % salt, and the diquat functionalized clay composition. In one embodiment, 0 to 20% salt is added to the drilling mud. In a preferred embodiment, 15 to 20% of salt is added to the drilling mud.

At the oil well drilling site, the diquat functionalized clay composition of the present invention may be incorporated into the mud at any time. It is especially useful when the mud is prepared in a conventional manner with the addition of the diquat functionalized clay composition of the present invention. In general, oil well mud is prepared by combining the diquat functionalized clay composition and brine. The proportions of the diquat functionalized clay composition and brine used in the mud are well known in the art, as are the methods used to combine them. It may also be possible to use the diquat functionalized clay composition of the present invention with water and clay in the absence of brine when making a well drilling fluid. It is also possible to employ the diquat functionalized clay composition of the present invention with an initial well drilling fluid which does not contain the diquat functionalized clay composition. In other words, an operator could start the drilling operation with a well fluid which does not contain the functionalized clay composition and later employ the functionalized clay composition of the present invention in drilling that well.

In practice the amount of the diquat functionalized clay composition added to the mud differs for different drilling operations. In most applications, the amount of diquat functionalized clay composition employed in the drilling fluid will not exceed about 35 pounds per barrel ("ppb") of the drilling fluid. In one embodiment, 0.875 ppb to 35 ppb of a diquat functional clay composition of the present invention is added to the drilling mud. In a preferred embodiment, 3.5 ppb to 10.5 ppb of a diquat functional clay composition of the present invention is added to the drilling mud.

The drilling fluids of this invention can contain other conventional wellbore additives as desired in conventional amounts. Examples of such additives include oil, filtrate reducers and viscosifiers such as starch, hydroxyethyl cellulose, carboxymethyl cellulose and other cellulosics, xanthan and other biopolymers, bentonite, lignosulfonate salts such as calcium or chromium lignosulfonates, emulsifiers, weighting agents, shale inhibitors such as polyacrylamides or glycols, specialty additives to control corrosion, lubricity and the like, as is well known in the art.

Diquat functionalized clay compositions of the present invention may be introduced into the wellbore in any number of ways known to those skilled in the art. Diquat functionalized clay composition of the present invention may be combined with brine and then added to mud made from conventional clays at the drill site prior to pumping it into the drill hole. Or, diquat functionalized clay compositions of the present invention may be added directly to a mud which contains conventional clays and the mud containing both functionalized and non functionalized clays can be pumped into the drill hole. In one embodiment, the drilling fluid composition may also include bentonite.

The invention can be used in any drilling fluid application where clays are currently used, including specifically such well treating applications as completions and workover operations. The term "drilling fluid" is meant to encompass, but not limited to completion fluids, workover fluids, lost circulation pills, kill fluids, drilling fluids to drill into productive formations, gravel packing fluids and fracturing fluids.

One function or feature of a water based drilling fluid is to suspend cuttings from the formation, produced by the bit at the bottom of the hole and to transport the cuttings out of the hole. The water based drilling fluids also suspend weight material, such as barium sulfate. By suspending the weight material, a drilling fluid helps to maintain a homogeneous column of mud that exerts a specified pressure to the formation. Rheological additives such as bentonite, cellulosics, and biopolymers are used for building this necessary rheology. However, none of the available rheological additives are both temperature stable (350° F.+) and salt tolerant (17 wt. % calcium and/or sodium chloride). Bentonite one of the primary rheological additives used in water based drilling fluids, flocculates when in the presence of divalent cations such as calcium (calcium chloride). Once the bentonite flocculates the rheological profile changes dramatically and the ability to suspend solids, including but not limited to weight material such as barite, diminishes.

During the drilling process, calcium and/or sodium chloride is encountered regularly whether it is from formation waters, drilling through a salt dome or taking in a salt water flow. The functionalized clay additive of the present invention provides for a drilling fluid having a substantially constant rheological profile in the presence of salt, such as calcium chloride.

The invention is illustrated by the following non-limiting examples. These examples show the surprising superiority of drilling fluids containing diquat functionalized montmorillonite clay composition.

EXAMPLES

Functionalized clays as indicated below were provided and formulated into model drilling fluids which were tested for fluid loss and rheological properties.

All fluids were prepared and tested according to standard API mud preparation guidelines using standard malt cups and a 5 spindle Hamilton Beach multimixer. The prepared fluids were placed in 316 stainless steel heat age cells. The cells were placed in a roller oven set at the desired temperature and hot rolled for sixteen hours. The cells were taken out and quenched in a sink filled with cold water. Rheological measurements were taken initially and after hot rolling cycle using a Fann model 35 Rheometer or equivalent. Measurements were taken as per API RP 13B procedures.

Base Mud Formulation
5 ppb diquaternary ammonium functionalized clay additive
175.4 lbs/bbl $H_2O$
174.6 lbs/bbl barite
$CaCl_2$ Mud Formulation
5 ppb diquaternary ammonium functionalized clay additive
175.4 lbs/bbl $H_2O$
174.6 lbs/bbl barite
35.1 lbs/bbl $CaCl_2$ Example 1

Example 1 shows results from a model well drilling fluid incorporating 5 ppb diquaternary ammonium functionalized clay additive with and without 20 wt. % calcium chloride. The diquat has a composition wherein R1 and R2 include methyl and y equals 2. Samples were prepared and tested for rheological properties after hot rolling at 150° F. according to API procedures. Test results are reported in Table 1.

The inventive diquat functionalized clay develops a rheological profile that is stable regardless of the salt concentration. As shown in Table 1, the diquat functionalized clay has a substantially constant rheological profile evidenced by comparing the 6 rpm reading for the fresh water mud solution and 6 rpm reading for the 20 wt. % calcium chloride brine solution. For purposes of this application, substantially constant rheological profile means the 6 and 600 rpm reading for the fresh water mud solution and 6 and 600 rpm reading for the 20 wt. % calcium chloride brine solution are within 50% of each other.

TABLE 1

| Sample/(CH)$_{y/z}$ length | PX4902/2/0 | |
|---|---|---|
| Salt, wt. % calcium chloride on top | 0 | 20 |
| OFI 800 viscosity @ 120° F. after HR 16 hr at 150° F. | | |
| 600 RPM Reading | 23 | 29 |
| 300 RPM Reading | 19 | 25 |
| 200 RPM Reading | 17 | 23 |
| 100 RPM Reading | 15 | 20 |
| 6 RPM Reading | 14 | 17 |
| 3 RPM Reading | 13 | 16 |
| Plastic Viscosity, cPs | 4 | 4 |
| Yield Point, lbs/100 ft$^2$ | 15 | 21 |

Example 2

Example 2 shows results from a model well drilling fluid incorporating 5 ppb alkoxylated diquaternary ammonium functionalized clay additive with and with and without 20 wt. % calcium chloride. The diquat has a composition wherein R1 and R2 include methyl or ethylene oxide. Samples were prepared and tested for rheological properties after hot rolling at 150° F. according to API procedures. Test results are reported in Table 2.

TABLE 2

| | 5 ppb | | 5 ppb + 20% CaCl2 | |
|---|---|---|---|---|
| | 150 F. | | | |
| PX4907R Concentration | Initial | HR | Initial | 150 F. HR |
| OFI 800 Viscosity @ 120° F. | | | | |
| 600 RPM Reading | 18 | 18 | 21 | 27 |
| 300 RPM Reading | 10 | 9 | 13 | 17 |
| 200 RPM Reading | 6 | 6 | 8 | 12 |
| 100 RPM Reading | 4 | 4 | 4 | 7 |
| 6 RPM Reading | 3 | 2 | 2 | 2 |
| 3 RPM Reading | 2 | 2 | 2 | 2 |
| Apparent Visc., cPs | 9 | 9 | 11 | 14 |
| Plastic Visc., cPs | 8 | 9 | 8 | 10 |
| Yield Point, Lbs/100 ft$^2$ | 2 | 0 | 5 | 7 |

Example 2 illustrates the effect of ethoxylated functionalized bentonite clay on the viscosity of water-based drilling mud with and without calcium chloride. The functionalized clay is stable to calcium chloride as evidenced by comparing the 6 and 600 rpm reading for the fresh water mud solution and 6 and 600 rpm reading for the 20% calcium chloride brine solution. The 6 and 600 rpm reading does not significantly change (0.50%) by adding 20 wt. % calcium chloride. The data shows that the drilling fluids of Example 2 have a substantially constant rheological profile in an aqueous solution containing 20 wt. % calcium chloride brine solution.

Example 3

Example 3 shows comparative results from a model well drilling fluid incorporating 10 ppb bentonite clay additive with and without and 20 wt. % calcium chloride.

TABLE 3

| Salt, wt. % calcium chloride on top | 0 | 20 |
|---|---|---|
| OFI 800 viscosity @ 120° F. after HR 16 hr at 150° F. | | |
| 600 RPM Reading | 23 | 30 |
| 300 RPM Reading | 12 | 25 |
| 200 RPM Reading | 9 | 23 |
| 100 RPM Reading | 7 | 20 |
| 6 RPM Reading | 4 | 15 |
| 3 RPM Reading | 4 | 15 |
| Plastic Viscosity, cPs | 9 | 5 |
| Yield Point, lbs/100 ft$^2$ | 3 | 20 |

As illustrated in Table 3, the drilling fluid containing a bentonite additive does not provide for a drilling fluid having a substantially constant rheological profile in the presence of calcium chloride. This is evidenced by the 6 rpm reading for the fresh water mud solution which increased from 4, for the fresh water mud solution, to 15 for the 20 wt. % calcium chloride brine solution.

The present disclosure may be embodied in other specific forms without departing from the spirit or essential attributes of the disclosure. Accordingly, reference should be made to the appended claims, rather than the foregoing specification, as indicating the scope of the disclosure. Although the foregoing description is directed to the preferred embodiments of the disclosure, it is noted that other variations and modification will be apparent to those skilled in the art, and may be made without departing from the spirit or scope of the disclosure.

What is claimed:

1. An aqueous drilling fluid comprising:
   water, 15-32 wt. % salt, and a functionalized clay composition dispersed into the water, said functionalized clay composition comprising: a montmorillonite clay exchanged with one or more diquaternary ammonium compounds having the formula:

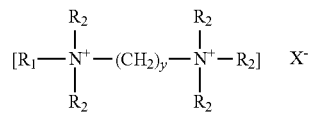

wherein $R_1$ is methyl;
   wherein $R_2$ is $R_1$;
   repeat unit y ranges from 2 to 6; and
   X— comprises an anion selected from the group consisting of chloride, methyl sulfate, acetate, iodide, and bromide.

2. The aqueous drilling fluid of claim 1, having a substantially constant rheological profile in the presence of salt.

3. The aqueous drilling fluid of claim 1, wherein X⁻ comprises chloride.

4. The aqueous drilling fluid of claim 1, wherein the drilling fluid is for drilling oil and gas wells.

* * * * *